United States Patent [19]

Murray

[11] Patent Number: 4,604,755

[45] Date of Patent: Aug. 5, 1986

[54] FEED FORWARD DUAL CHANNEL AUTOMATIC LEVEL CONTROL FOR DUAL TONE MULTI-FREQUENCY RECEIVERS

[75] Inventor: Jack T. Murray, Raleigh, N.C.

[73] Assignee: International Business Machines Corp., Armonk, N.Y.

[21] Appl. No.: 616,087

[22] Filed: Jun. 1, 1984

[51] Int. Cl.$^4$ .................. H04B 1/16; H04M 1/50
[52] U.S. Cl. .................. 375/98; 179/84 VF; 381/107; 455/235; 455/239
[58] Field of Search .............. 179/84 VF; 455/35, 36, 455/234, 235, 239; 381/107; 375/98; 340/825.48, 825.73, 825.74; 328/138, 173; 364/484; 370/110.3; 324/78 D

[56] References Cited

U.S. PATENT DOCUMENTS

| | | | |
|---|---|---|---|
| 3,539,731 | 11/1970 | Legedza | 179/84 VF |
| 3,909,549 | 9/1975 | Tarridec et al. | 179/84 VF |
| 4,145,580 | 3/1979 | Hasegawa | 179/84 VF |
| 4,206,323 | 6/1980 | Padgett et al. | 179/84 VF |
| 4,273,965 | 6/1981 | Cowpland et al. | 179/84 VF |
| 4,386,239 | 5/1983 | Chien | 179/84 VF |

*Primary Examiner*—Marc E. Bookbinder
*Attorney, Agent, or Firm*—Edward H. Duffield

[57] ABSTRACT

A dual tone multi-frequency receiver having an improved automatic level control is described. The level control is performed after the filtering operation instead of before the filtering operation as was done in previous designs. Separate channels are derived for each of the tone groups and are handled separately for automatic level control in feed forward responsive correction circuits. Improved responsiveness to twist distortion with a fast attack tracking and holding capability results.

6 Claims, 4 Drawing Figures

FEED FORWARD DUAL CHANNEL AUTOMATIC LEVEL CONTROL FOR DUAL TONE MULTI-FREQUENCY RECEIVERS

FIELD OF THE INVENTION

This invention relates to telephone communications systems in general and specifically to dual tone multi-frequency receivers as employed in such systems.

PRIOR ART

Dual tone multi-frequency receivers are commonly employed in the telephone arts. The Bell Telephone Type 403D data set is one such example. These data sets may be employed on the standard EIA-RS-464 I & II interfaces. These are typically used for long haul communications applications and will be well known to those of skill in the art.

Dual tone multi-frequency receivers usually employ an automatic gain control circut to compress the dynamic range of the composite signals for ease in further filtering or detecting. However, the automatic gain control is normally performed prior to the filtering operation that separates the composite signal into the tone group channels which are commonly used. Servo control will typically be achieved in such systems by loop convergence of a controlled parameter that reflects RMS magnitude of the signals. The parameter will then be used in a feedback mode to control a gain element. Such feedback loops involve numerous design tradeoffs well known to those skilled in the art. The response in terms of attack rate, response time, response precision and overall stability are important interrelated criteria with differing requirements that conflict with one another and cause the tradeoff situation to exist. Additionally, complex response loops may be used following the filtering to approach desirable characteristics such as an instantaneous attack time which is stable. However, the feedback loops which are added create an undesirable signal overshoot which extends the adaptive convergent period. In addition, complex signals such as dual tone multi-frequency signals when employed in an echo sensitive environment such as telephone lines result in amplitude twisting due to transmission channel characteristics that vary with tone and frequency. These pose severe design constraints when signal levels are controlled by the magnitude of the composite signal. Twisting distortion passed through a single channel automatic gain control will severely strain any downstream soft limiters normally employed for echo protection. The higher level channel will dominate the overall signal and will see, for the frequencies in that channel, an optimum limit and detection action which will simultaneously reduce the detection margin for the other reduced amplitude channel. To avoid this difficulty causing the loss of the low amplitude channel, the twist allowance factors cannot exceed the echo parameter specifications in a fixed threshold detection system. In addition, the twist parameters for logically sorting out the two channels with different thresholds are not generally available from classical automatic gain control circuits and additional processing is often required to control the twist distortion.

OBJECTS OF THE INVENTION

In view of the foregoing known difficulties and drawbacks with the prior art, it is an object of this invention to provide an improved dual tone multi-frequency receiver which performs signal level control automatically on each separately filtered channel after they have been separated by the filter groups.

Yet another object of the invention is to provide an improved dual tone multi-frequency receiver in which the dual channel automatic level control is achieved with a feed forward response circuit for stable and rapid attack times.

Yet another object of the invention is to provide an improved twist distortion control in dual channel multi-frequency receivers.

SUMMARY

The foregoing and still other objects of the invention which have not been specifically enumerated are met in the present invention in a preferred embodiment of an improved multi-tone multi-frequency receiver for long haul telephone data transmission signalling. Improved automatic level control circuits are incorporated which operate in a feed forward mode on each of the separate channels independently. This is performed following the initial filtering and separation operations in contrast with the normal automatic level control which is performed prior to the filtering operation. The dual channel level control technique employs peak sampling and holding principles in which sub-band samples are taken and compared in magnitude to previously stored peaks. The operations are performed simultaneously and independently for each of the separate tone channels. If the samples taken are found to be greater than or equal to the stored peak level, the sample will be used to replace the peak. Otherwise, a run length counter will be incremented and the count tested for a given value. When and if the value is found, a fraction of the current peak will be used to replace the peak currently held. This function provides a decay or recovery rate to prevent the maximum peak from being retained indefinitely. When a higher peak is found, a delay count will be reset and the new peak is stored for use. Fractional multipliers control independently the recovery rate for each channel after a determined delay is set by the count threshold. This delay separates normal envelope variations from true digit endings. Channel amplitude distortion and twist distortions, which are relations between the separate peaks, are detected after the peak sample and hold. The results of the amplitude distortion and twist detector are used to enable or disable further detection logic as necessary.

BRIEF DESCRIPTION OF THE DRAWINGS The present invention will be described with relation to a preferred embodiment thereof as depicted in the drawing in which.

DETAILED SPECIFICATION

In dual tone multi-frequency receivers in which the symbol elements are channalized by tone groups, the elements are generally constant in magnitude and a precise automatic level control may be practiced on each channel with a stabilized feed forward technique. The feed forward corrections can be controlled by instantaneous peak following parameters as taught herein. The dual channel feed forward automatic level control incorporated in the present invention handles the group channelized tones typically employed in long haul multi-frequency signaling systems. Separate automatic level controls are employed for each channel or single tone group. The separate automatic level controls also provide, by comparison to one another, a cross channel amplitude distortion measure for detecting logically the effect of twist and to provide control for the twist which occurs. Open loop or feed forward controls referenced to measured peaks in each channel provide absolute stability with a desirable, virtually instantaneous attack time. Programmable recovery characteristics are also included by providing each channel with a peak acquisition and hold function that is augmented by a controlled delay or recovery function. This yields a normalization parameter which is fed forward to 4 and 11 for normalizing the channel signal independently of the other channel. A ratio function is derived for each channel and used to set the peak signal in that channel instantaneously to a designed absolute level without any overshoot. The normalized channel signals may be peak limited (5 and 12) and fed through tone filters (6 and 13) for detection with ample echo protection. Additionally, the two separate channel normalization parameters can be compared to one another in a second ratio finding operation and the output of this used to test against threshold values to enable or inhibit any further detection processes.

Figure 1:
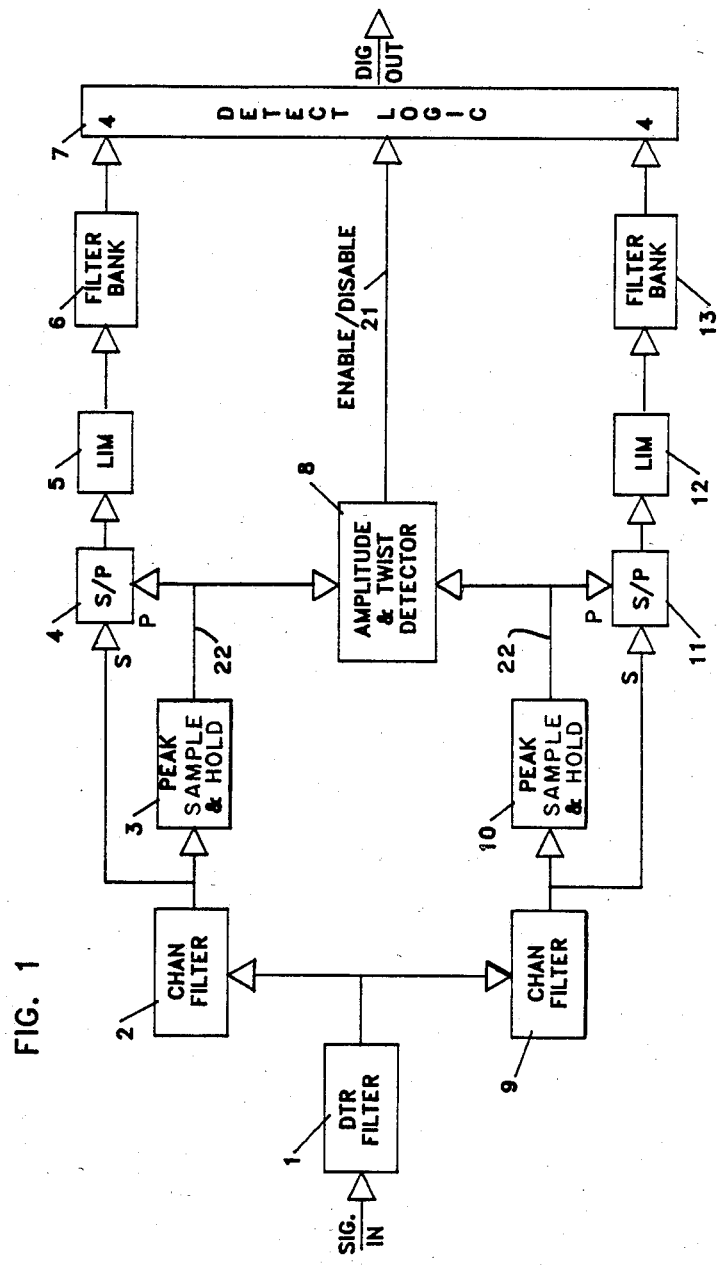
FIG. 1 illustrates a preferred embodiment in block schematic form for dual tone multi-frequency receiver in accordance with the principles of this invention.

Turning to FIG. 1, the multi-frequency receiver of a preferred embodiment of the present invention is shown in block form. The separate channel automatic level control as envisioned in this invention is included. The dual tone receiver filter 1 is connected to the telephone line and filters the overall signal of both combined channels and supplies the output to the separate channel filters 2 and 9 respectively. The channel filters 2 and 9 break the incoming stream from the line filter 1 into separate tone group signal paths in the classical fashion normally employed in the prior art. Typically, a set of 4 tones will comprise a tone group and one of the tones will be selected from each group for a signalling symbol.

The peak sample and hold circuits 3 and 10 respectively capture the running peak group signals during buildup of amplitude in each channel. Ratio dividers 4 and 11 produce separate ratios for the instantaneous signal level divided by the peak which has been stored. This is performed for each separate channel as shown. Dividing the channel signal by the peak value forces the peak in the limiter circuits 5 and 12 to equal a scale value of unity. The limiters 5 and 12 are provided for protection against digit simulation through aliasing as described by Soderberg et al in "The Touch Tone Telephone Transmission of Digital Information," appearing in the IEEE Transactions on Communications Technology, Vol. COM-15, pgs. 812–824, dated December, 1967.

During the steady state interval of each symbol period, the peak hold function continues to monitor for any changes in the peak value and is implemented in such a way that it will track any peak increase. The maximum input to the limiters (5 and 12) is thus always controlled in this design. When signals in the channel end, recovery of sensitivity is implemented by augmenting the peak which is currently held in each sample peak hold and recovery circuit 3 and 10 by a constant factor. Cessation of signals in the channel is detected by counting consecutive intervals when the peak is not maintained and testing the count of non-maintained peaks against a design threshold. The amplitude distortion and twist detector in block 8 monitors the ratio between the two measured channel peaks and tests against a design threshold for enabling or disenabling further detection by a control line 21 connected to detection logic 7. An absolute signal level measurement is also used in similar fashion by the amplitude detector in block 8 to enable or disenable further detection functions in the detection logic 7.

Filter banks 6 and 13 for each separate channel and the detection logic 7 complete the usual multi-frequency receiver and provide, within the tone group, separate isolation and detection and the usual various timing constraint measurements. It is the individual channelization with separate channel automatic level control that is the core of this present invention. Elements 1, 2, 9, 6, 13 and 7 are of classical prior art design and employed in their normal fashion. The additions in the present invention of (a) the individual peak sampling and hold and recovery circuits 3 and 10(b), the separate amplitude and twist detector 8 for comparing the content of the channels by comparing their separate peak amplitudes and the ratio forming circuits 4 and 11 and limiting circuits are new additions as envisioned in this invention.

Figure 2:
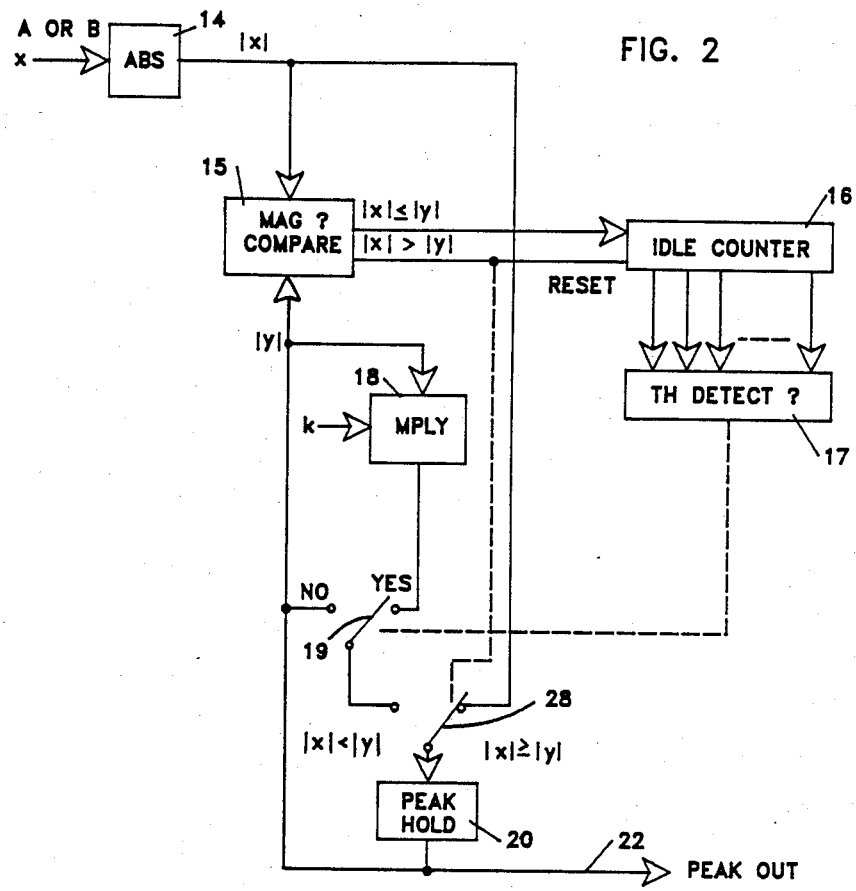
FIG. 2 illustrates in block schematic form the operative method and components making up the peak sample and hold recovery circuit as employed in FIG. 1.

Turning to FIG. 2, the peak sample and hold circuits employed in boxes 3 and 10 of FIG. 1 are shown in greater detail. Incoming signals for a given channel A or B are applied to an absolute amplitude measurement circuit 14 the output of which is the absolute value of the amplitude of the incoming signal. The absolute value of the magnitude is compared in the comparator 15 with the currently held peak value from the peak holding register 20. If the incoming absolute magnitude measurement is less than or equal to the presently held peak, idle counter 16 will be incremented but if the presently incoming value is greater than the present peak, the idle counter will be reset. The contents of the idle counter 16 are compared in a threshold detector or comparator 17 against a prestored threshold count and when a true comparison is found, switch 19 is operated.

When the incoming input equals or exceeds the peak value which is stored, the new peak will be stored in the sample magnitude peak register 20 by connecting the switch 28 leg to the absolute value portion of the circuit. If the incoming signal's magnitude is less than that stored presently as the peak, this event is counted in the counter as previously noted and the count is tested in the threshold detector as described. If the design threshold stored in the comparator 17 is met or exceeded, the fractional multiplication decrement (k) to the peak held magnitude will be generated by multiplier 18 decrementing the peak value. This value will replace the peak stored in the peak hold register 20 via switch 19 to reduce its level and provide sensitivity recovery once incoming signals have ceased. If neither the incoming value is greater than or equal to the peak held nor the idle threshold is reached, combined action of switches 19 and 28 causes the same peak value to be repeated. Since the peak testing function always precedes the application of the normalized feed forward control 22 to ratio circuits 4 or 11, shown as the peak output 22 from peak hold circuit 20, the result applied to the limiters 5 and 12 of FIG. 1 can never exceed the scaled value of 1 and there is no overshoot. This is so since the peak output 22 will be divided into the incoming signal sample and in the dividers 4 and 11 as shown in FIG. 1 before application to the limiters 5 and 12 and filters 6 and 13.

Figure 3:
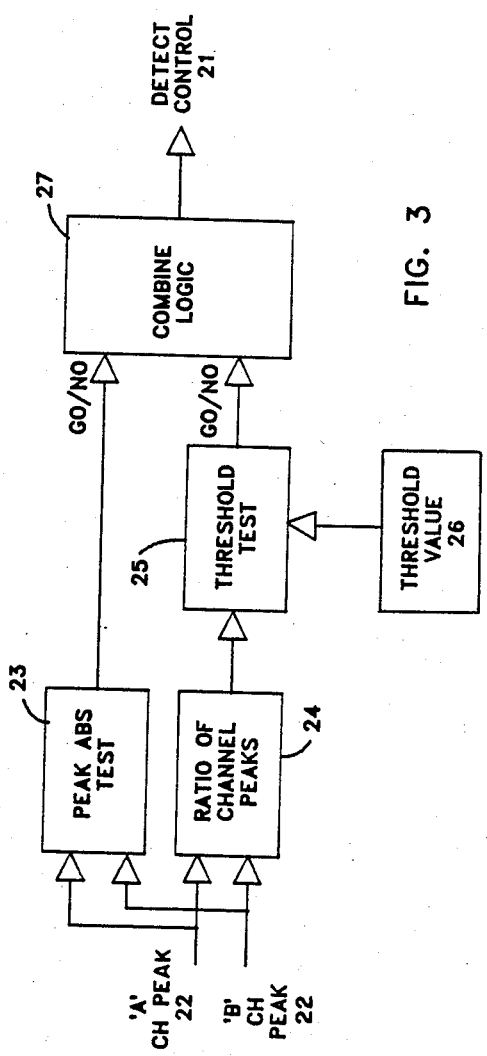
FIG. 3 illustrates in block schematic form the elements and principles employed in the twist distortion testing circuitry as illustrated in FIG. 1.

Turning to FIG. 3, the individual channel peak outputs are each applied to the peak absolute test circuit 23 and to the channel peak ratio former 24. The ratio former 24 is a divide circuit and the pek absolute test circuit 23 compares the incoming absolute peak levels from each channel against a minimum absolute acceptable level to determine whether the enable or disenable function of the combining logic connected to the detection control should be indicated.

Twisting tests are performed between the normalization measures of the channel which are the peak. Usually a logarithmatic ratio is specified as a limit such as -8 db for dual tone multi-frequency class 1 receivers. A valid digit detection for such a receiver is based upon a single sinusoidal channel signal having peaks normalized to a scale value of 1. Under these circumstances, a fixed threshold held in a register 26 can be compared in a comparator 25 against the ratio of channel peaks coming from the divider 24. The comparator can test a precise ratio in db as desired. A go or no-go, i.e., enable or disenable decision based upon the comparison in comparator 25 is also sent to the combining logic 27 so that if either the absolute peak value test or the threshold comparison test fails, further detection and control may be aborted.

Figure 4:
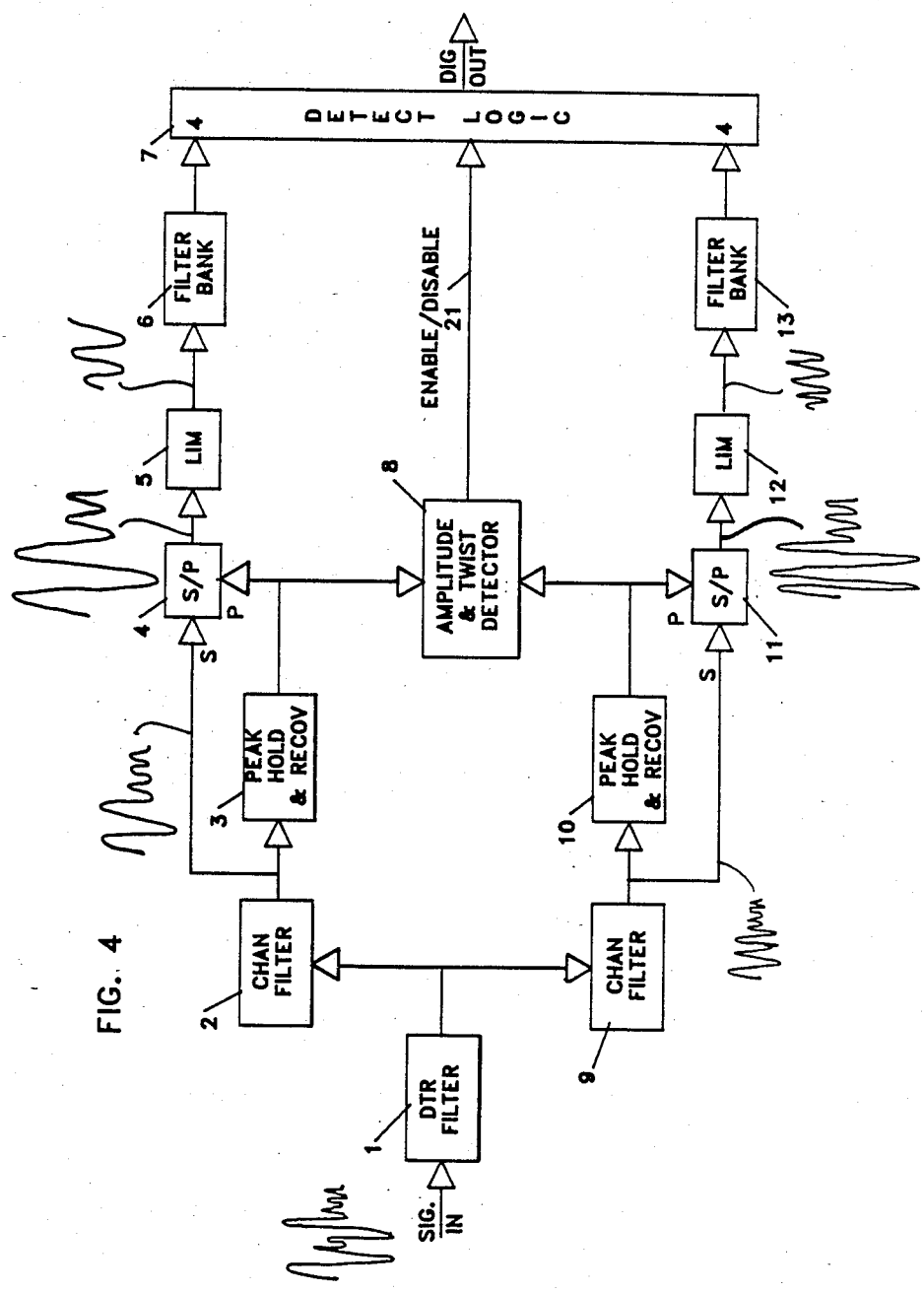
FIG. 4 illustrates schematically with waveform diagrams superimposed next to the corresponding circuit elements as shown in FIG. 1 to show how the preferred embodiment of the invention modifies incoming signals.

Turning to FIG. 4, the multi-frequency time waveforms from the telephone line are applied to the line filter 1. A two-tone multi-frequency symbol with twist and echo is shown at the input. The separate channel analog signals resulting from the filters 2 and 9 are shown separately following those filters. The ratio dividing circuits 4 and 11 generate the normalized waveforms having absolute magnitudes of unity scale value are shown adjacent the outputs of each of these divider circuits 4 and 11 respectively. The output from the limiters 5 and 12 are the envelope limited, gain controlled, separaly filtered channel signals for application to the filter banks 6 and 13 in preparation for any further detection in the digital logic network. Level metrics waveforms from peak holds 3 and 10 are shown adjacent to the amplitude and twist detector 8 inputs to same.

Advantages of the dual channel automatic level control applied to separate channels in a dual tone multi-frequency receiver utilizing the feed forward automatic level control, peak following of the feed forward automatic level control, and a ratio divide control, where the denominator is a previously stored peak, give an ideal twist distortion detection and correction without the inherent drawbacks of the feedback or prefilter automatic level control circuits of the known prior art. It will be apparent to those of skill in the art that numerous departures from the specific embodiment may be made without violating the essential scheme of the feed forward, dual channel automatic level correction as envisioned in this invention.

Therefore, what is desired to be protected by Letters Patent and what is claimed in the following claims is set forth by way of description and not by way of limitation:

1. A method of controlling signal level for a dual tone multi-frequency receiver comprising steps of:
   separating incoming dual tone multifrequency signals into at least two separate tone group channels by passing said incoming signal through separate channel filter banks;
   sampling the output of each of said filter banks independently and isolating the absolute magnitude value of the signal level in each said sample;
   comparing each said sample against a previously stored sample magnitude that represents a peak value;
   storing each new sample as a new peak value if its value is greater than or equal to said stored peak value and incrementing a count in a counter if said sample value is less than said stored peak value;
   comparing said count against a given threshold value and multiplying said stored sample peak value by a fractional amount to reduce its level when a true comparison between said threshold and said count is found; and
   resetting said counter whenever said sample value exceeds the stored peak value; and
   dividing each said sample by said stored peak value to form a signal level normalized ratio for application to an envelope limiter thereby providing separate channel automatic level control for each of the two channels in a dual tone multi-frequency receiver of the class described.

2. The method of controlling signal level gain for a dual tone multifrequency receiver comprising steps of:
   separating incoming dual tone multifrequency signals into at least two separate tone group channels by passing said incoming signal through separate channel filter banks;
   sampling the output of each of said filter banks independently and isolating the absolute magnitude value of the signal level in each said sample;
   comparing each said sample against previously stored sample magnitude that represents a peak value;
   storing each new sample as a new peak value when its value is greater than or equal to said stored peak value; and
   dividing each said sample by said stored peak value to form a signal level normalized ratio for application to an envelope limiter thereby providing separate channel automatic signal level control for each of the two channels in a dual tone multifrequency receiver 3. A method as described in claim 2 and further including steps of:
   detecting twist distortion between channels in a dual tone multifrequency receiver, comprising steps of:
   forming the ratio between said channel peaks; and
   comparing said ratio against a threshold value for determining the existence of twist distortion.

4. A method as described in claim 4, further comprising steps of:
   incrementing a count in a counter whenever said absolute magnitude of signal is less than or equal to the present peak value; and resetting said count whenever said absolute magnitude of signal exceeds the presently stored peak value;

comparing said count in said counter against a threshold count and, whenever a true comparison is found, multiplying said stored peak value by a fractional multiplier; and replacing said stored peak value with the result of said multiplication.

5. Apparatus for feed forward dual channel automatic level control in dual tone multifrequency receivers, comprising:

means for separating incoming dual tone multifrequency signals into at least two separate tone group channels;

sampling and absoulte value detecting means connected to said separating means for sampling the outputs of said separating means and isolating the absolute magnitude values of signal levels in each said sample for each channel;

magintude comparing means for comparing each said sample against a previously stored sample magnitude representing a peak value;

storing means for storing each said new sample as a new peak value when its value is greater than or equal to said stored peak value; and dividing means for dividing each said sample by said stored peak value to form a signal level controlled normalized ratio; and signal limiting means connected to said divided means for receiving said controlled normalized ratio and providing a maximum predetermined amplification level to each channel in a dual tone multifrequency receiver.

6. Apparatus as described in claim 6, and further comprising:

counting means connected to said magnitude comparing means, said counting means being incremented whenever a sample value is less than id stored peak value; and threshold comparing means connected to said counting means and to a threshold value storing means for providing a true or false output depending upon said comparison; and multiplying means connected to said threshold comparing means and to said peak value storing means for multiplying said peak value by a fractional amount to reduce its level whenever a true comparison between said threshold value and the contents of said counting means is found by said threshold comparing means; and said magnitude comparing means resetting said counting means whenever said sample value exceeds said stored peak value.

* * * * *